United States Patent Office 3,363,025
Patented Jan. 9, 1968

3,363,025
THERMOPLASTIC PHENOL-FORMALDEHYDE/POLYAMIDE GRAFT COPOLYMERS
Chester W. Fitko and Abraham Ravve, Chicago, Ill., assignors to Continental Can Company, Inc., New York, N.Y., a corporation of New York
No Drawing. Filed June 11, 1965, Ser. No. 463,395
30 Claims. (Cl. 260—831)

ABSTRACT OF THE DISCLOSURE

An adhesive thermoplastic phenol-formaldeyhde/polyamide graft copolymer is prepared by condensing a phenol and formaldehyde in the presence of a high molecular weight polyamide and subsequently reacting the polyamide and phenol-formaldehyde condensation product at a temperature ranging from 100° to 180° C. in the presence of an acid catalyst to form the graft copolymer.

---

This invention is directed to a polymer composition and more specifically to a high molecular weight thermoplastic copolymer prepared by grafting a phenol and formaldehyde product onto the amide groups of a high molecular weight polyamide. More specifically, this invention is directed to a method of preparing thermoplastic graft copolymers which comprises reacting a high molecular weight polyamide, such as nylon, with a reaction product of phenol and formaldehyde in the presence of an acid catalyst. The graft copolymers are prepared by reacting the polyamide with the phenol and formaldehyde product at temperatures ranging up to about 180° C. in the presence of an acid catalyst and more preferably in the presence of toluenesulphonic acid.

The polymer compositions of this invention are particularly useful as a constituent for the preparation of cements, coatings, sealants and the like. Potentially, these polymers are easy to dye and, therefore, highly useful for the preparation of fibers, but may be also used as casting resins, potting compounds, molding resins, etc.

Heretofore, attempts to react phenol and formaldehyde with nylon-type polyamides have proven difficult, in that it was hard to control the rate of reaction and almost impossible to isolate the products. In prior attempts, acid catalysts, such as formic acid, catalyzed the condensation of the components to form an insoluble, infusible resin. In other words, many of the acid catalysts cause the nylon to form thermosetting products with formaldehyde rather than thermoplastic graft copolymers. To overcome these problems, it has been found that the reaction should be carried out in a particular solvent and that this solvent should be approximately neutral or have a pH of about 7. It has been found, for example, that the preferred solvent consist of phenol or a mixture of phenol with other diluents such as xylene, dimethyl sulfoxide or dimethyl formamide. Xylene is particularly useful only because of its comparatively low cost. The polyamide, e.g., nylon, is dissolved in the solvent, e.g., phenol, in an amount such that the phenol is present in excess of the theoretical amount needed to condense with the polyamide. The formaldehyde, such as paraform, is subsequently added in equal molar amounts based on the number of amide groups in the polyamide and is added in about three increments over a period of about three hours at temperatures of about 100–180° C. or 120–150° C. Under these reaction conditions, without the effect or presence of a catalyst the phenol and formaldehyde condense. After the reaction of the formaldehyde and phenol is completed, the catalyst, i.e., toluenesulphonic acid, is added in an amount ranging from about 0.01 to about 0.1 molar ratio based on the number of amide groups in the polyamide. The reaction between the polyamide and the reaction products of phenol and formaldehyde previously formed is then carried out at a temperature ranging from about 100° C.–180° C. and preferably at 120° C.–150° C. for an additional period of time ranging from about one half to one and one-half hours. The final product is then precipitated from the reaction mixture with acetone or other known ketone solvents.

Accordingly, it is an object of this invention to provide a thermoplastic polymer and more specifically a graft copolymer characterized as having a substituted phenol-formaldehyde, hydroxyphenyl methane or a phenolic novolac grafted onto a number of the nitrogen atoms of the amide groups.

It is another object of this invention to provide a high molecular weight thermoplastic polymer characterized as a graft copolymer of a condensation product of a phenol and formaldehyde and a high molecular weight polyamide, i.e., nylon.

It is still another object of this invention to provide a graft copolymer characterized as a nylon polyamide having grafted on a number of the amide groups an equivalent amount of a phenolic compound prepared by reacting said polyamide with a product of formadehyde and phenol in the presence of an effective amount of an acidic catalyst.

It is still another object of this invention to provide a high molecular weight graft copolymer of a polyamide and a condensation product of a phenol and formaldehyde which may be used for the preparation of fibers, molded products, adhesives, extruded products, coating compositions, etc.

It is still a further object of this invention to provide a method of preparing a thermoplastic graft copolymer characterized as being prepared from a high molecular weight nylon-type polyamide and a phenol-formaldehyde condensation product. The phenol, including hydroxybenzene and substituted phenols, is first reacted with the formaldehyde without the catalyst and then with the polyamide in the presence of an effective amount of an acid catalyst, such as toluenesulphonic acid.

It is still a further object of this invention to provide a method whereby a graft copolymer of a high molecular weight polyamide and a phenolic compound can be reacted, under normal condensation conditions, to obtain a copolymer which has a variety of uses.

It is still a further object of this invention to provide a method of preparing a graft copolymer of a high molecular weight polyamide and a phenolic compound which comprises the use of toluenesulphonic acid as the catalyst and the phenol or a phenol-solvent mixture as the solvent. The reaction between the phenol-formaldehyde compound and polyamide takes place at temperatures ranging from about 100°–180° C. or 120°–150° C. in the presence of the acid catalyst.

These and other objects of this invention will become apparent after a more detailed description of the invention as follows:

It has been found that a high molecular weight thermoplastic graft copolymer of a high molecular weight polyamide and a phenol-formaldehyde product can be prepared by reacting the nylon-type polyamide with the phenol-formaldehyde product in the presence of an effective amount of an acid catalyst and more specifically toluenesulphonic acid. More specifically, it has been found that thermoplastic graft copolymers of nylon-type polyamides and a phenol-formaldehyde compound can be obtained by reacting the components, under condensation conditions. The phenol-formaldehyde compound is reacted with the polyamide at a temperature ranging between 100°–180° C. and preferably at 120°–150° C. for periods of 1 to 7 hours until the phenolic compound is grafted onto 20–30% of the amide groups of the polyamide.

The relative proportions of the polyamide to the phenol is approximately 1.0 to 3.5 and preferably 3.0 moles of the phenol for each amide group in the polyamide with the formaldehyde ranging from about 1.0 to 2.5 moles of formaldehyde for each amide group of the polyamide. The acid catalyst is used in amounts ranging from about 0.01 to 0.1 mole of the acid for each mole of the amide group.

The linear polyamides of this invention are known and can be prepared, for example, by reacting carbonic acid or a dicarboxylic acid or derivatives of a dibasic carboxylic acid with a primary amine. The derivatives of the dibasic acids include the anhydrides, amides, half esters, etc. The amines have at least two hydrogen atoms attached to each of the nitrogen atoms and include ethylene diamine, tetramethylene diamine, pentamethylene diamine, hexamethylene diamine, octamethylene diamine, decamethylene diamine, and other amines having at least two carbon atoms between the amino groups.

The carboxylic acids capable of forming amides with the amines include, for example, adipic acid, suberic acid, sebacic acid, azelaic acid, malonic acid, undecandioic acid, glutaric acid, pimelic acid, tetradecanedioic acid, carbonic acid, oxalic acid, etc. The average molecular weight of the polyamides may range from about 1,000 to 7,000. Specific examples of the polyamides include polypentamethylene adipamide, polyhexamethylene adipamide, polydecamethylene adipamide, polyoctamethylene adipamide, polyoctamethylene sebacamide, polyhexamethylene sebacamide, polypentamethylene sebacamide, polydecamethylene suberamide, polyhexamethylene suberamide, and polypentamethylene suberamide. The polyamides can also be prepared from lactams such as caprolactam and from amino acids such as 11-aminoundecanoic acid.

The polyamides, for purposes of this invention, may be prepared, for example, by reacting approximately 15 parts-by-weight of pentamethylene diamine with 30 parts-by-weight of sebacic acid in the presence of about 45 parts-by-weight of solvent. The reactor is fitted with a distillation unit to return the solvent lost by distillation and a means of introducing nitrogen to the reactor. The mixture is heated for approximately 10 to 15 hours at about 210–220° C. The reaction products are then treated in an aliphatic alcohol to precipitate the polyamide as a white granular material.

In addition to the lactams, some of the polyamides which may be used in preparing the graft copolymers may be characterized by the following formula:

(I) 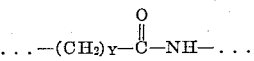

wherein X has a value of at least two, and Y has a value ranging from 0 to 12. Other polyamides can be obtained by polymerization, for example, of a monoamino monocarboxylic acid which may be characterized by the formula:

(II) 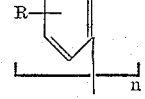

wherein Y has a value ranging from 4 to 12.

The polyamides prepared from the above-mentioned amines and carboxylic acids are reacted with a phenol or monohydroxybenzene and formaldehyde, so as to obtain graft copolymers characterized by the formula:

(III) 

wherein $n$ is an integer of 1 or 2, X is an integer of at least 2, Y has a value ranging from 0 to 12, and R is a substituent selected from the group consisting of hydrogen, alkyl, aryl, alkaryl and aralkyl radicals having 1 to 9 carbon atoms. Other copolymers can be characterized by the formula:

(IV) 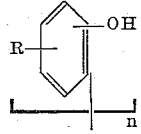

wherein $n$ has a value of 1 or 2, Y has a value ranging from 4 to 12 and R is a substituent selected from the group consisting of hydrogen, alkyl, aryl, alkaryl and aralkyl radicals having 1 to 9 carbon atoms.

The phenols to be grafted on the polyamide include hydroxybenzene and substituted phenols wherein the substituent is selected from the group consisting of alkyl, aryl, alkaryl, and aralkyl radicals having 1 to 9 carbon atoms. The substituted phenols include the normal as well as the branched aliphatic groups, such as cresol, and nonyl phenol. Other phenol compounds may include the alkaryl-substituted phenols, such as 4,4-isopropylidene diphenol, and the aromatic-substituted phenols, such as p-phenyl phenol. Typical examples of the phenols used in preparing the graft copolymers include a para- and ortho-substituted phenols wherein the organic substitutent contains 1 to 9 carbon atoms and includes such compounds as p-tertiary butyl phenol, p-phenyl phenol, p-tertiary heptyl phenol, 2,4-ditertiary butyl phenol, p-cyclohexaphenol, isopropylphenol, para- and ortho-cresol and the like.

The phenolic compound is grafted onto the nitrogen atom of the amide groups at reaction temperatures ranging from about 100°–180° C. or 120°–150° C. The formaldehyde may be used as a solid material, i.e., paraformaldehyde. The phenolformaldehyde compound is condensed onto the amide groups of the polyamide in the presence of an effective amount of toluenesulphonic acid. The acid is used as a catalyst in amounts ranging from about 0.01 to 0.1 molar equivalents to the amount of the polyamide.

Generally the polyamide is mixed with the phenol or a phenol-solvent mixture at a temperature ranging from about 100°–180° C. The paraformaldehyde is added in increments over a three-hour period while being held at the condensation temperatures. Subsequently toluenesulphonic acid or a solution of toluenesulphonic acid in phenol is added and the reaction is continued at these temperatures for about an additional hour. The formation of the graft copolymer can be illustrated by the following equations:

(V)
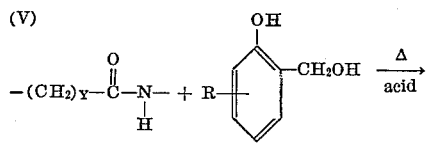
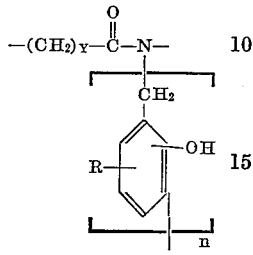

(V-A)
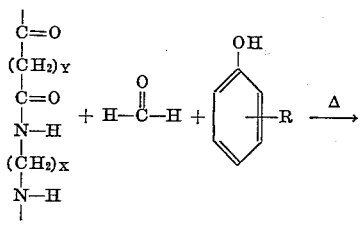

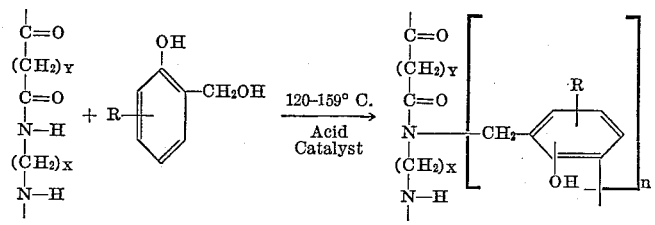

wherein $n$ has a value of either 1 or 2, X is an integer of at least 2, Y has a value ranging from 0 to 12 and R is a substituent selected from the group consisting of hydrogen, alkyl, aryl, alkaryl, and aralkyl radicals having 1–9 carbon atoms.

The following examples are illustrations of the method by which the grat copolymers of this invention can be prepared.

EXAMPLE I

Preparation of graft copolymer of phenol novolac and poly(11-undecanoamide):

| | Parts-by-weight |
|---|---|
| Poly(11-undecanoamide) | 36.6 |
| Phenol | 56.4 |
| Xylene | 109.8 |
| Paraformaldehyde | 6.6 |
| Toluenesulphonic acid | 1.9 |
| Phenol | 6.0 |

The poly(11-undecanoamide) was dissolved in the mixture of phenol and xylene at 130°–140° C. The first portion of paraformaldehyde was added at 130° C. and the exothermic reaction raised the temperature of the reaction mixture to 135° C. After one hour's reaction at 135° C., the second portion of paraformaldehyde was added. This procedure was repeated with the third portion. One hour after the final addition of paraformaldehyde, toluenesulphonic acid dissolved in phenol was added to the reaction slowly. The temperature of the batch roes slowly to 145°–147° C. After one hour reaction with the acid catalyst, the graft copolymer was precipitated out with acetone and the ungrafted material was extracted further with acetone. The melting point of the grafted copolymer was 154°–161° C. The melting point of nylon 11 was 190°–192° C.

The product obtained may be characterized by the following empirical formula:

(VI)
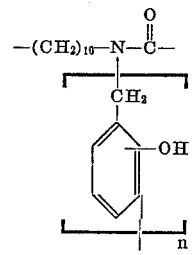

The above product is sparingly soluble in acetone, appreciably soluble in hot alcohol and in a 5% sodium hydroxide or potassium hydroxide solution comprising a 50:50 alcohol-water mixture.

EXAMPLE II

| | Parts-by-weight |
|---|---|
| Poly(hexamethyleneadipamide) | 56 |
| Phenol | 141 |
| Xylene | 160 |
| Paraformaldehyde | 18 |
| Toluenesulphonic acid | 0.5 |

The same procedure as in Example I was followed. The melting point of the graft copolymer is 255°–267° C. compared to 262°–270° C. for nylon 6,6. The product can be characterized as follows:

(VII)
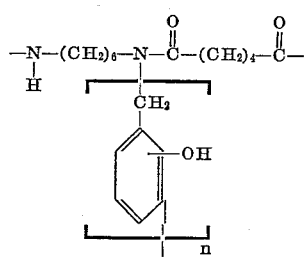

EXAMPLE III

| | Parts-by-weight |
|---|---|
| Poly(hexamethylenesebacamide) | 39 |
| Phenol | 60 |
| Xylene | 110 |
| Paraformaldehyde | 6.6 |
| Toluenesulphonic acid | 0.45 |

The same procedure as in Example I was followed. The melting point of the graft copolymer is 214–216° C.

compared to 215° C. for nylon 6,10. The product can be characterized as follows:

(VIII)
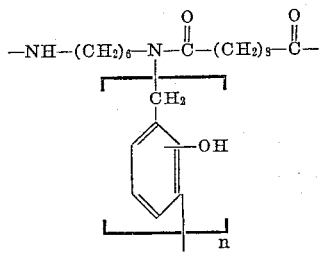

TABLE I.—MELTING POINTS OF STARTING NYLONS AND RESPECTIVE GRAFT COPOLYMERS PREPARED

| | M.P., °C. | |
|---|---|---|
| | Nylon | Copolymer |
| 1. Nylon 11 (poly 11-undecanoamide) | 190-192 | |
| Nylon 11-phenol-formaldehyde | | 154-161 |
| Nylon 11-paracresol-formaldehyde | | 170-173 |
| Nylon 11-paranonylphenol-formaldehyde | | 159-161 |
| 2. Nylon 6,10 (polyhexamethylene-sebacamide) | 215 | |
| Nylon 6,10-phenol-formaldehyde | | 214-216 |
| 3. Nylon 6,6 (polyhexamethylene-adipamide) | 262-270 | |
| Nylon 6,6-phenol-formaldehyde | | 255-267 |
| 4. Nylon 6 (polycaproamide) | 215-220 | |
| Nylon 6-phenol-formaldehyde | | 216-220 |

TABLE II.—SOLUBILITIES OF GRAFT COPOLYMERS

| | Butanol | Amyl Alcohol | Dimethyl-Formamide | Dimethyl-Sufoxide | Cyclo-Hexanone |
|---|---|---|---|---|---|
| I. Nylon 11 | Insol | Insol | Sol. Hot | Sol. Hot | Sol. Hot. |
| Nylon 11-formaldehyde phenol | Sol. Hot | Sol. Hot | Sol. Hot | Sol | Sol. Hot. |
| Nylon 11-formaldehyde p-cresol | Part. Sol. Hot | Sol. Hot | Sol. Hot | Sol. Hot | Sol. Hot. |
| Nylon 11-formaldehyde nonyl phenol | Insol | Sol. Hot | Sol. Hot | Sol. Hot | Sol. Hot. |
| II. Nylon 6,10 | Insol | Insol | Part. Sol. Hot | Sol. Hot | Insol. |
| Nylon 6,10-formaldehyde-phenol | Insol | Insol | Sol. Hot | Sol. Hot | Insol. |
| III. Nylon 6,6 | Insol | Insol | Insol | Sol. Hot | Insol. |
| Nylon 6,6-formaldehyde-phenol | Insol | Insol | Part. Sol. Hot | Sol. Hot | Insol. |
| IV. Nylon 6 | Insol | Insol | Sol. Hot | Sol. Hot | Insol. |
| Nylon 6-formaldehyde-phenol | Insol | Insol | Sol. Hot | Sol | Insol. |

NOTE.—All of above graft copolymers are water-insoluble.

EXAMPLE IV

| | Parts-by-weight |
|---|---|
| Poly(11-undecanoamide) | 36.6 |
| p-cresol | 65.0 |
| Xylene | 109.8 |
| Paraformaldehyde | 6.6 |
| Toluenesulphonic acid | 0.47 |

The same procedure as in Example I was followed. The melting point of the graft copolymer is 170–173° C. as compared to 190–192° C. for nylon 11. The product may be characterized by the following structure:

(IX)
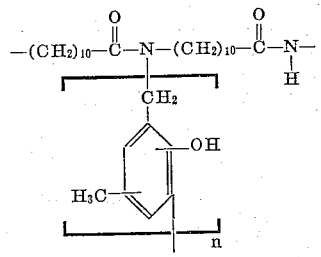

The graft copolymers prepared in accordance with this invention may be further characterized as copolymers which have no N-methylol groups but which have phenol groups on about every third to fifth amide group of the copolymer. These graft copolymers are refusable at temperatures of about 170°–270° C., are completely water-insoluble, and are prepared at higher temperatures, e.g., temperatures ranging up to about 180° C. The phenol and formaldehyde are condensed initially to form a phenol alcohol which is comparatively reactive and thereby is more readily grafted onto the polyamide. In carrying out the reaction, the catalyst is preferably toluenesulphonic acid but other strong acids, such as sulphuric acid, may be used without any difficulties.

The following tables compare the melting points of the graft copolymers, as prepared in accordance with this invention, with the melting points of the starting nylons. Table II particularly points out the relative solubilities of the graft copolymers of this invention, in various solvents, in comparison to the solubilities of the starting nylons. All of the graft copolymers of this invention, however, are water-insoluble.

The graft copolymers of this invention may be used for a variety of purposes and particularly for the preparation of adhesive compositions. Thus, for example, it is possible to mix the graft copolymers with an epoxy resin for purposes of preparing cements which can be used for bonding metals and particularly for bonding aluminum. The epoxy resins may be obtained by reacting, for example, epichlorohydrin with 2,2-di(p-hydroxyphenyl)propane which has an average molecular weight of about 900. It has been discovered that upon adding an epoxy resin to the phenol-polyamide graft copolymers, it is possible to obtain an adhesive composition which is particularly outstanding with respect to its peel strength. Approximately 15–25% by weight of any known epoxy resin, such as Epon 828, can be formulated with the graft copolymers to obtain an adhesive composition. The adhesive composition is particularly good for aluminum, and has a peel strength comparable to and in some instances better than the peel strength of 2/98 (tin/lead) solder on tinplate.

A typical example of preparing a cement composition is illustrated as follows:

EXAMPLE V

| | Parts-by-weight |
|---|---|
| Polyamide-phenol-formaldehyde graft copolymer of Example I | 50 |
| Epoxy resin (Epon 828) | 10 |
| Dicyandiamide | 1 |
| Acetone-alcohol (90–10% mixture) | mls 200 |

The above ingredients were mixed and stirred until sufficient solvent was evaporated to obtain a paste. The paste was spread out and allowed to dry. The dried powder was then ready for use as an adhesive. Initially, the Strokes cure of the adhesive was determined in order to determine the curing time required. A metal plate was then heated to 470° F. and the powdered cement was applied and spread into a thin film. After cooling, two metal plates were assembled for bonding. The assembled plate was reheated to 470° F. under light-pressure to insure intimate contact of the cement with the metal plates. The heating at 470° F. was continued for the period determined by the Strokes cure test. The plate was then cooled and cut into one-inch strips and the peel strength was determined. The peel strength was determined by pulling apart the bonded strips at angles of 180° to the bond in an Instron at the rate of 0.5 inch per minute.

While this invention has been described with respect to a number of specific embodiments, it is obvious that there are other variations and modifications which can be used without departing from the spirit of the invention except, however, those modifications which are not intended to be included in the appended claims.

We claim:

1. A high molecular weight thermoplastic graft copolymer characterized by the formula:

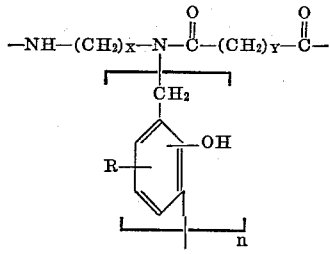

wherein $n$ is an integer of 1 or 2; X is an integer of at least 2; Y is an integer having a value of 0 to 12; and R is a substituent selected from the group consisting of hydrogen and alkyl, aryl, alkaryl and aralkyl radicals having 1 to 9 carbon atoms.

2. The thermoplastic graft copolymer of claim 1 further characterized in that the R substituent is ortho to the hydroxyl group.

3. The graft copolymer of claim 1 further characterized in that the R substituent is a branched radical and is para to the hydroxyl group.

4. A high molecular weight thermoplastic graft copolymer characterized by the formula:

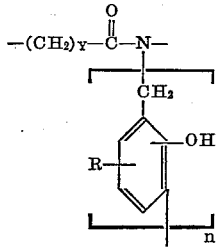

wherein $n$ is an integer of 1 or 2; Y is an integer of 4 to 12; and R is a substituent selected from the group consisting of hydrogen and alkyl, aryl, alkaryl, aralkyl radicals having 1 to 9 carbon atoms.

5. A high molecular weight thermoplastic graft copolymer characterized by the formula:

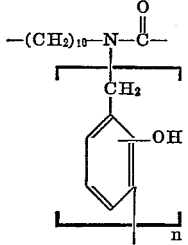

wherein $n$ is an integer of 1 or 2.

6. A high molecular weight thermoplastic graft copolymer characterized by the formula:

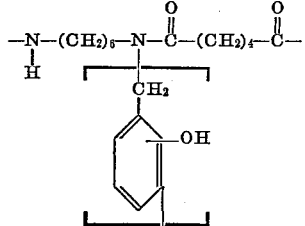

wherein $n$ is an integer of 1 or 2.

7. A high molecular weight thermoplastic graft copolymer chracterized by the formula:

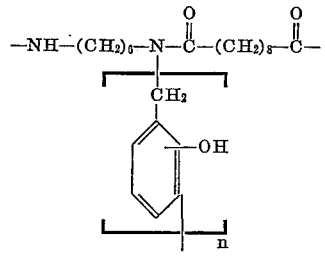

wherein $n$ is an integer of 1 or 2.

8. A high molecular weight thermoplastic graft copolymer characterized by the formula:

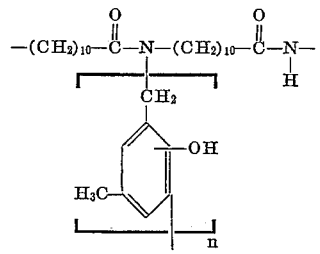

wherein $n$ is an integer of 1 or 2.

9. The high molecular weight thermoplastic graft copolymer characterized by the formula of claim 1 wherein $n$ is an integer of 1.

10. An adhesive polymeric composition consisting essentially of 15 to 25% by weight of an epoxy resin and 75 to 85% by weight of the phenolic-polyamide graft copolymer of claim 1.

11. An adhesive polymeric composition consisting essentially of 15 to 25% by weight of an epoxy resin and 75 to 85% by weight of the phenolic-polyamide graft copolymer of claim 4.

12. The adhesive composition of claim 10 further characterized in that the composition contains an effective amount of an organic solvent.

13. A method of preparing a thermoplastic graft copolymer characterized by the formula:

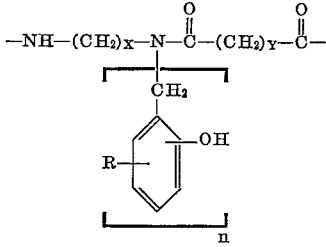

wherein $n$ is an integer of 1 or 2; X is an integer of at least 2; Y is an integer having a value of 0 to 12; and R is a substituent selected from the group consisting of hydrogen and alkyl, aryl, alkaryl and aralkyl radicals having 1 to 9 carbon atoms which comprises condensing a phenol and formaldehyde in the presence of a high molecular weight polyamide and subsequently reacting the polyamide and phenol-formaldehyde at a temperature ranging from about 100° C. to 180° C. in the presence of an effective amount of an acid catalyst; the relative proportion of said polyamide to phenol ranging from about 1 to 3 moles of phenol for each amide group of the polyamide with the formaldehyde ranging from about 1.0 to 2.5 moles for each amide group.

14. The method of claim 13 further characterized in that the polyamide is poly(hexamethylene adipamide).

15. The method of claim 13 further characterized in that the polyamide is poly(hexamethylene sebacamide).

16. The method of claim 13 further characterized in that the polyamide is polycaproamide.

17. The method of claim 13 further characterized in that the phenol is selected from the group consisting of hydroxybenzene, alkyl-substituted phenols, aryl-substituted phenols, alkaryl-substituted phenols, and aralkyl-substituted phenols wherein the substituents contain 1 to 9 carbon atoms.

18. The method of claim 13 further characterized in that the phenol is an alkyl-substituted phenol.

19. The method of claim 13 further characterized in that the polyamide is solubilized in the phenol before condensing the phenol with the formaldehyde.

20. The method of claim 13 further characterized in that the phenol is a para-substituted alkyl phenol.

21. The method of claim 13 further characterized in that the reaction is carried out at a temperature ranging from about 120° to 150° C.

22. The method of claim 13 further characterized in that the polyamide is solubilized in a mixture of phenol and a solvent selected from the group consisting of dimethyl sulfoxide, dimethyl formamide xylene.

23. A method of preparing a thermoplastic graft copolymer characterized by the formula:

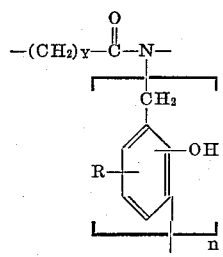

wherein $n$ is an integer of 1 or 2; Y is an integer of 4 to 12; and R is a substituent selected from the group consisting of hydrogen and alkyl, aryl, alkaryl, aralkyl radicals having 1 to 9 carbon atoms, which comprises condensing a phenol and formaldehyde in the presence of a high molecular weight polyamide and subsequently reacting the polyamide and phenol-formaldehyde at a temperature ranging from about 100° to 180° C. in the presence of an effective amount of an acid catalyst; the relative proportion of said polyamide to phenol ranging from about 1 to 3 moles of phenol for each amide group of the polyamide, with the formaldehyde ranging from about 1.0 to 2.5 moles for each amide group.

24. The method of claim 23 further characterized in that the polyamide is polyundecanamide.

25. The method of claim 23 further characterized in that the phenol is selected from the group consisting of hydroxybenzene, alkyl-substituted phenols, aryl-substituted phenols, alkaryl-substituted phenols, and aralkyl-substituted phenols wherein the substitutents contain 1 to 9 carbon atoms.

26. The method of claim 23 further characterized in that the phenol is an alkyl-substituted phenol.

27. The method of claim 23 further characterized in that the polyamide is solubilized in the phenol before condensing the phenol with the formaldehyde.

28. The method of claim 23 further characterized in that the phenol is a para-substituted alkyl phenol.

29. The method of claim 23 further characterized in that the reaction is carried out at a temperature ranging from about 120° to 150° C.

30. The method of claim 23 further characterized in that the polyamide is solubilized in a mixture of phenol and a solvent selected from the group consisting of dimethyl sulfoxide, dimethyl formamide and xylene.

References Cited
UNITED STATES PATENTS

| 2,799,596 | 7/1957 | Frantz | 260—841 |
| 3,261,884 | 7/1966 | Gorton | 260—841 |

MURRAY TILLMAN, *Primary Examiner.*

G. F. LESMES, *Examiner.*

P. LIEBERMAN, *Assistant Examiner.*